INVENTOR.
Charles B. Grady Jr

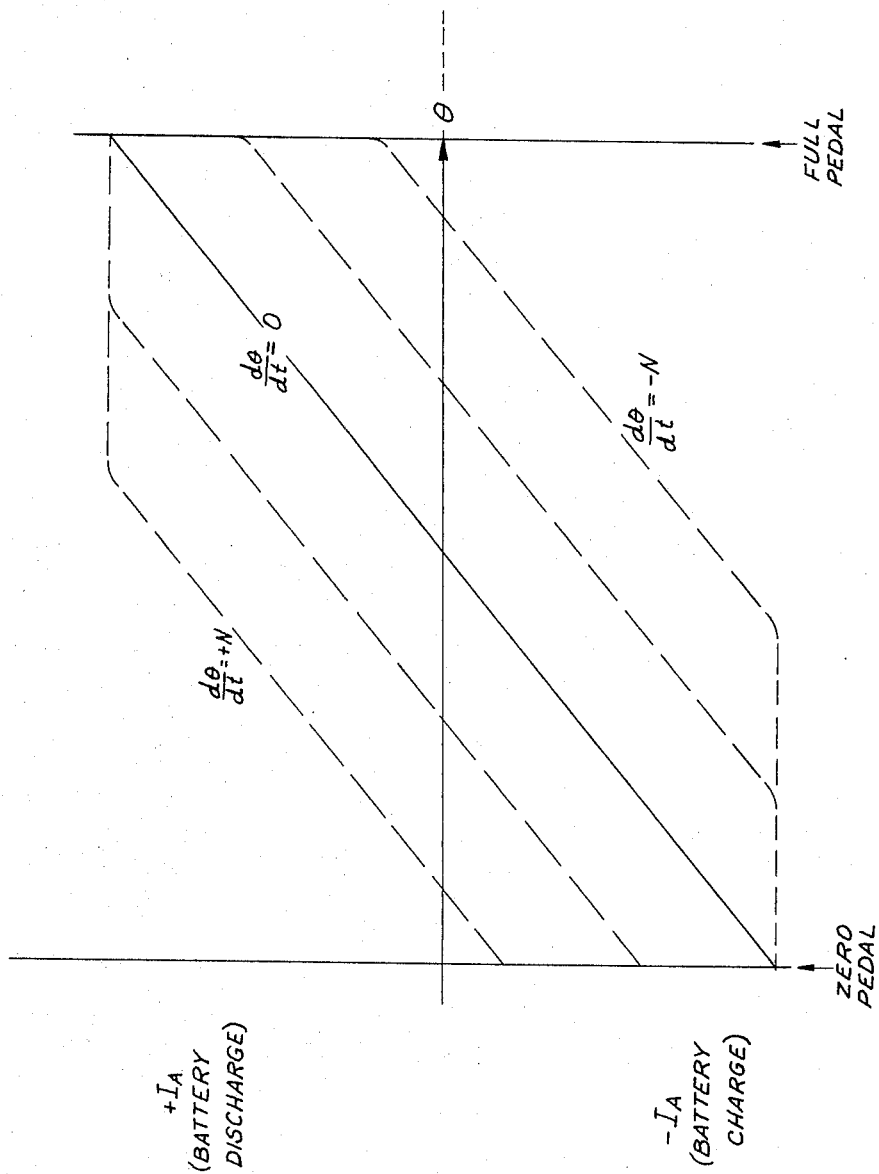

United States Patent Office 3,454,122
Patented July 8, 1969

3,454,122
ENERGY CONSERVATIVE CONTROL DRIVE
FOR ELECTRIC VEHICLES
Charles B. Grady, Jr., 1 Ridgeway Ave.,
West Orange, N.J. 07052
Filed May 29, 1967, Ser. No. 642,117
Int. Cl. B60k 1/02; H02p 5/06, 3/14
U.S. Cl. 180—65                                         6 Claims

ABSTRACT OF THE DISCLOSURE

The magnetic field flux of a battery-operated vehicular motor-generator is controlled solely by a servoamplifier responsive to a bipolar feedback signal generated by the magnitude and direction of current through its armature under constant voltage excitation.

A second bipolar torque demand signal from the operator's controls is algebraically summed with the armature feedback signal so that negative torque demand signals result in dynamic braking, which recharges the battery.

The speed control range of several such motors is extended by switching the armatures from series to parallel at a predetermined speed. Preset centrifugal clutches keep these motors idling.

Background of the invention

The choice between conventional direct current electric motors has, before the present invention, been between series, shunt, or compound connected machines. Each of these types has its own characteristic torque-speed current characteristics depending on the interactions, if any, between the field and armature currents, and the effect of back electromotive force in the armature at a given magnetic field flux density and armature speed.

The series type motor has traditionally been chosen for traction applications (trolley cars, golf carts, locomotives, etc.) because at low speeds it exhibits high torque, and at high speeds it yields lower torques, as required for vehicle propulsion.

However, if it is desired to conserve energy by converting the motor into a generator for recharging the batteries by means of the dynamic braking of the vehicle during deceleration, the series motor presents serious problems, because as a generator it is unstable, and, consequently, it would be necessary to employ auxiliary compound or shunt field windings to which the device could be switched in the regenerative mode. As will be seen, the present servo field invention allows this motor to generator conversion to be accomplished silently without switching, while providing an ideal torque-speed-current characteristic.

The reason that energy conservation by dynamic battery recharging is necessary in electric vehicles is evident from the following comparison:

Electric cars using batteries are limited in their range and alacrity by their energy per unit weight of battery. This density ranges from about 12 watt-hours per pound for conventional lead-acid batteries, to about 150 watt-hours per pound for some (expensive) developmental batteries.

These figures do not include the associated drive motors, which might weight 1.5 to 5 pounds per horsepower.

In comparison, a modern internal combustion automobile engine of 200 horsepower together with a 20 gallon tank full of gasoline can store at least 400 watt-hours of energy per pound weight.

This comparison is somewhat misleading because gas engines require many power-consuming accessories such as water, oil, and gas pumps, electric generators and hydraulic drives, most of which are not needed in electric cars.

Also, gas cars must be aerodynamically high-drag vehicles because most of the latent chemical energy of the fuel must be transferred to the air stream as heat, whereas electric cars can convert their stored battery energy to kinetic vehicle energy with good efficiency, and, therefore, can have clean aerodynamic lines.

However, the foregoing comparison shows the necessity of regenerative battery charging, if an electric car is to compete successfully with a gas car.

Besides regeneration, it is also important to conserve energy in the control system. Vehicles using series rehostats for control, of course, throw away energy in heat, as well as degrading the potential torque delivery of their motor.

A recent design of vehicle, in an effort to improve efficiency, employs high current capacity solid state switching devices to vary the average current delivered to its series type motor by rapidly interrupting this heavy current. Although this obviates rehostat losses, it introduces a formidable radio-frequency interference problem, which is a serious obstacle to such a vehicle's practicality. This design provides no means of dynamic battery regeneration because of the difficulty of converting a series motor into a compound generator and because of the unidirectional current characteristics of this type of control.

Similar comments apply to another recent electric car design in which heavy duty solid state devices are used to convert the direct battery current into variable frequency alternating current, so as to permit the use of an induction motor as the driving agent. This alternating current drive, of course, provides no means for dynamic battery regeneration, since the A.C. induction motor cannot be converted into a generator.

Finally, the present electric car art does not contribute anything to the man-machine control interface beyond the simple use of a torque demand pedal (or lever) for electrical acceleration, and a separate unrelated pedal for the dissipative deceleration provided by mechanically or hydraulically actuated brake drums or disks.

Summary of the invention

The present invention overcomes the foregoing limitations on (a) automatic regenerative battery conservation, (b) nondissipative noninterruptive control, and (c) logical man-machine control interface, by providing a direct current brush commutated motor-generator in which the field is neither shunt, series, or compound connected, but in which the field is servo-excited by a high gain power amplifier whose basic feedback control input signal is a voltage proportional to the magnitude and direction of the current through the armature under constant voltage excitation. This closed servo loop by itself would tend to feed the field winding the maximum current possible so as to attempt to reduce the armature current to zero. When such a closed servo loop control is used with an automatic preset centrifugal clutch interposed between the motor-generator and a drive wheel of the vehicle, the foregoing high field excitation will result in the idling of the motor at its lowest field saturated speed, which is designed to be lower than the speed at which the centrifugal clutch is set to engage the vehicle load to the motor-generator.

If, now, a torque demand signal originating in a suitable operator control pedal (or lever) is superimposed on the armature current feedback input to the servoamplifier so as algebraically to oppose it, the field flux will drop, and the motor will accelerate until the back (or counter) electromotive force of the armature comes to equilibrium with its exciting voltage plus its ohmic voltage drop. The resulting increase of speed will operate the foregoing centrifugal clutch into engagement, and the vehicle will begin to share the acceleration of the motor by receiving torque in proportion to the overriding torque demand signal. That is, for every setting of the torque demand control pedal there will be an armature current whose feedback signal will just balance the opposing torque demand signal. If the motor is not running so as to produce the demanded torque, an error signal equal to the algebraic difference bteween the feedback signal and the demand signal will be highly amplified and will alter the field current (and the consequent magnetic field flux) in a direction tending to satisfy the demanded torque.

This invention now teaches that it is necessary only to superimpose in a summing network at the amplifier input of such a servo loop a third dynamic braking demand signal which is greater in magnitude and opposite in polarity to the foregoing torque demand signal to immediately convert the motor into a dynamic braking generator which will absorb torque from the drive wheel at the expense of vehicle kinetic energy whereby to charge the battery which had been powering the motor. This is because the servo loop, in order to reduce to zero the error signal (representing the algebraic sum of the armature current feedback signal, the torque demand signal and the overpowering dynamic braking, or battery charging, demand signal) will automatically adjust the field current to the value required to reverse the polarity of the armature current, that is, to convert it from a motor to a generator by increasing the field flux until the net armature voltage exceeds the battery voltage.

The choice of armature current as the controlling criteria for the field feedback loop has several advantages over using speed or torque, for instance, as the controlling start up) directly in series with the battery, this system also inherently protects the battery.

The opposing polarity dynamic braking demand signal may be generated in several ways or by a combination of these control means.

In the preferred embodiment of the invention the charging or dynamic braking command signal comes either from the early motion of a mechanical brake pedal before the mechanical brakes are actually applied, or from any decrease of displacement of a torque demand pedal (accelerator). This rate of change signal is easily electrically derived according to the invention by a capacitor across the summing resistor of the torque demand signal. parameter. This is because, over a wide range, the armature current is quite proportional to the torque to be demanded, but it also automatically takes into consideration the necessity of limiting the armature current at all times to a safe value. Since the armature is (except in initial Alternatively, this battery charging signal can be arranged to be generated during the pretravel of a spring biased torque demand pedal so that release of the torque demand pedal will call for dynamic braking.

In any case, mechanical braking will be required for very low speeds below the effective dynamic braking range and after the centrifugal clutches have disengaged.

In order to extend the range of speed control, the invention also teaches a wheel tachometer controlled switch which shifts the armature brush connections for at least two motors from series to parallel as the vehicle exceeds a predetermined road speed. Means are provided to provide the proper field excitation during any armature switching to minimize switching errosion.

The principal object of the subject invention is to provide a smooth, silent, and compact drive control for battery powered electric cars which will extend their range and performance by automatically converting a large part of the vehicle's kinetic energy into stored battery energy.

Another object is to provide an energy conserving drive control system for battery powered electric cars which will not require new operating skills for the driver beyond those now required of conventional gas auto drivers.

Still another object is to provide a torque demand control for electric vehicles which will respond to the rate of displacement of this control to provide dynamic braking for negative rates of change and, conversely, anticipatory torquing for positive rates of change.

A further object of the invention is to provide an extended range of speed control for electric cars having multiple servo-field motor drives in which the armatures are switched from series connection to parallel connection as the road speed of the vehicle exceeds a predetermined value.

An additional object of the invention is to provide a servo field motor drive for electric cars which prevents excessive armature in-rush currents by providing preset centrifugal clutches for each drive wheel so as to disconnect the wheel load from the motor generators at idling speeds.

For other objects reference is made to the following specifications and claims.

*Brief description of the drawings*

FIGURE 2 is a graph of the variation of armature current with torque demand pedal displacement for various rates of pedal displacement for the system of FIGURE 1.

Referring to FIGURE 1, it may be seen that the schematic diagram shows two motor-generators 20 and 21 having, respectively, brush commutated armatures 22 and 23 and field windings 24 and 25 for producing flux in the magnetic field circuits of motor-generators 20 and 21 respectively. Motor-generator 20, secured to the vehicle chassis 26, is connected through a preset centrifugal clutch 27 and a chain or belt reduction drive 28, to a left drive wheel 29, while motor-generator 21 (also secured to chassis 26) is connected through a similar clutch 30 and reduction drive 31 to a right drive wheel 32. Numeral 76 represents the torque transfer shaft connecting the rotary armature and its winding 24 to the centrifugal clutches 27 and 30.

Figure 1:
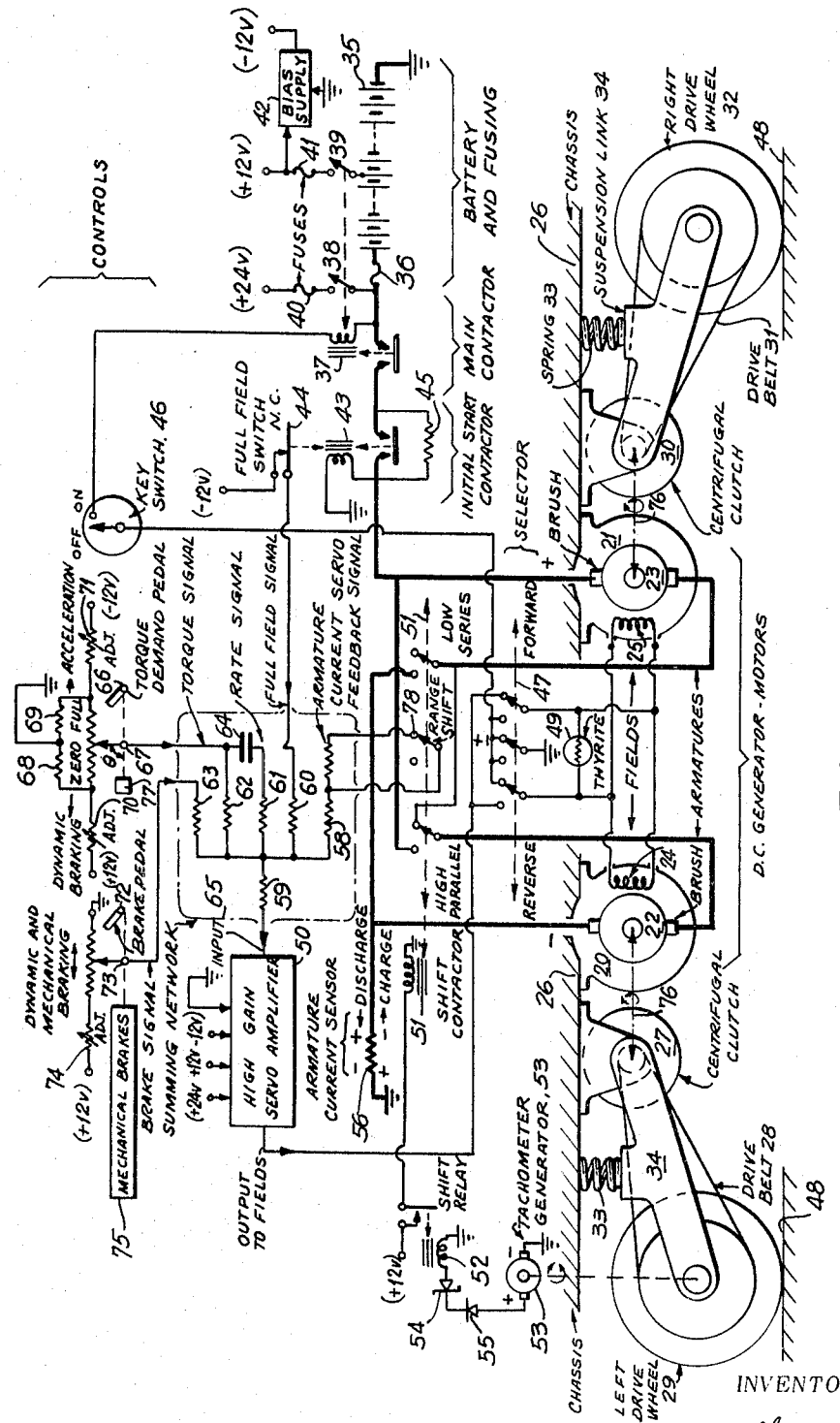
FIGURE 1 is a schematic diagram of the preferred embodiment of the invention showing a two motor-generator servo field drive having centrifugal clutches, series-parallel armature switching and a torque demand signal generated by a combination of torque pedal position, torque pedal rate of displacement and brake pedal operation.

Springs 33 and suspension links 34 allow articulation of drive wheels 29 and 32 with respect to chassis 26, while being driven or while driving the reductions 28 and 31 and while in contact with the ground 48.

A storage battery 35 is provided with a main fuse 36, a main contactor type relay 37, which has two auxiliary switch contacts 38 and 39 and fuses 40 and 41 for disconnecting and protecting the various voltages used in the system, including the opposite polarity bias voltage supplied by a conventional D.C. to D.C. type bias power supply 42.

For initial start-up a contactor 43 with an auxiliary N.C. switch 44 is provided. The N.O. main contacts of relay 43 are shunt connected to a starting resistor 45 so that after the motors 20 and 21 have come up to a speed sufficient to reduce the voltage drop in resistor 45 to a predetermined value, contactor 43 will pull in thereby shorting out resistor 45 and remaining thereafter "locked up" until main contactor 37 is deenergized. The latter is energized through N.O. vehicle key switch 46 and through one pole of the field reversing switch 47, so that armature currents will be interrupted during the reversal of field currents.

The field windings 24 and 25 are connected in parallel and are shunted by a thyrite nonlinear resistor 49 to minimize arcing when their excitation is reversed.

Switch 47 selects the direction of current excitation which the fields receive from a high gain servoamplifier 50.

The means provided to shift the armatures 22 and 23 from series to parallel connection across the battery 35 at a predetermined road speed comprise a three pole double throw contactor 51 whose coil is energized on the closure of the N.O.S.P.S.T. contacts of relay 52 when the voltage of wheel driven D.C. tachometer generator 53 exceeds the breakdown voltage of Zener diode 54. Diode 55 is provided to disable relay 52 for reverse motion of the vehicle.

Regardless of whether the armatures are in series or parallel, the total armature current must pass through the current sampling resistor 56, which is on the order of a few milliohms. The bipolar voltage appearing across resistor 56 will then vary directly with the magnitude and direction (i.e., charge or discharge) of the armature current. This armature current signal voltage across resistor 56 is applied through resistors 57, 58 and 59 as a feedback signal to the input of servoamplifier 50, thereby completing the basic closed loop servo control of field windings 24 and 25.

Resistors 57, 58 and 59, together with input resistors 60, 61, 62 and 63 and the differentiating capacitor 64 form the components of a summing network 65 for performing the logic of the subject control system.

For a given polarity of battery connections such as that shown in FIGURE 1, the several servoamplifier input signals have polarities which oppose or aid the basic feedback loop signal in the algebraic summing network 65, according to their function. Thus, for torque demand control, a foot pedal 66 is provided and is suitably linked to a potentiometer 67. Pedal 66 is preferably spring biased to a zero or released position ($\theta=0$) by a spring 77. Potentiometer 67 is effectively grounded at some intermediate electrical point by the dividing resistors 68 and 69 and is fed opposite biasing polarities of voltage through the adjustable resistors 68 and 69, one at each end.

For the "full throttle" position of pedal 66 ($\theta=1$) the summing resistor 62 is given a negative voltage signal which, therefore, opposes the discharge polarity of feedback current sampling resistor 56 as applied to amplifier 50 through resistors 57, 58 and 59. Consequently, the output of amplifier 50 is reduced so as to decrease the field current and increase the torque output and armature current until the drop across resistor 56 equals the opposing voltage delivered from potentiometer 67 for $\theta=1$.

Conversely, when the demand pedal 67 is fully released ($\theta=0$), a positive potential from resistor 70 is applied to the amplifier summing resistor 59, so that a current reversal is required in armature resistor 56 in order to balance out the servo error signal. This results in an increase of field current and flux from amplifier 50 until the resulting increased voltage appearing across the armatures exceeds the battery voltage. At this point dynamic braking results along with the conversion of the drive motor into a generator for transforming kinetic energy of the vehicle through its drive wheels into stored battery energy. It is to be noted that wherever the terms "bipolar" or "polarity" are used it implies that the potentials referred to are greater or less than some reference potential. In the schematic diagram of FIGURE 1, this reference potential is "ground" and the amplifier accepts input signals which may be bipolar with respect to ground. At an intermediate position of pedal 66, as determined by the ratio of resistors 68 and 69, zero torque demand signal (i.e., ground potential) will be applied to summing resistor 62. The closed servo loop, in the absence of any other summing control signal, will automatically adjust the field so as to make the armature current zero as dictated by feedback loop path 56, 57, 58 and 59. Under these conditions the vehicle will coast.

The foregoing basic control arrangement thus automatically provides the control signals to perform dynamic recovery of kinetic energy at the expense of vehicle momentum, while not requiring any new skill of the operator, since the pedal sequence of push to accelerate and release to decelerate is natural to a gasoline powered car driver. This shift from motor to generator operation of course corresponds to a shift of the direction of power flow through torque shaft 76 between a flow from the motor to the wheels and a flow from the wheels to the generator under the demand of the pedal controls 66 and/or 72.

Contact 78 on the automatic shift contactor 51 is provided to short out resistor 57 for changing the range of the servo feedback signal when the armatures are connected in series. In this way, the heavier currents through resistor 56 associated with parallel armature operation will be compensated for in the summing network by the corresponding increase of their signal summing resistance from resistor 58 alone, to resistors 57 plus 58.

A feature which has been added to this embodiment of the invention is the provision of the differentiating capacitor 64 and its summing resistor 61. The result of this combination is to generate a control voltage in the summing network 65 which produces a positive dynamic braking input voltage to the amplifier 50 for decreasing displacements of torque demand pedal 66 ($-d\theta/dt$) and, conversely, to produce negative increased torque demand signals for increasing displacements of pedal 66 ($+d\theta/dt$). This effect may be seen more clearly in FIGURE 2, where the pedal displacement from $\theta=0$ to $\theta=1$ is plotted against the charge or discharge current flowing through the armatures.

In the absence of capacitor 64 (or for very small or zero values of $d\theta/dt$) the potentiometer 67 will produce torque demand signals which are effectively linear with displacement (at a given motor speed). The effect of increasing or decreasing rates of pedal change is to bodily displace the original torque-displacement function (solid line in the graph) to the left or right, respectively. Thus, the car response anticipates the eventual pedal position thereby speeding the dynamic braking or advancing the rate of acceleration.

Summing resistor 63 receives a signal from a potentiometer 73 which is linked to a pedal 72 for controlling the mechanical braking system 75. Since potentiometer 73 is fed a positive bias voltage from adjustment resistor 74, it can be designed to produce a dynamic braking demand signal which will overwhelm any other competing torque demand signal. By adjusting this signal to be generated during the pretravel of pedal 72 before brakes 75 are actually energized, a safety feature is provided to guarantee that the brake pedal 72 always prevails over the torque pedal 66 or any other soruce of torque demand.

Finally, summing resistor 60 is capable of adding in a negative signal tending to increase the field current to its maximum. This "full field" signal is called for by the closed position of switch 44 corresponding to the start-up, or unenergized condition, of starting contactor 43. This is evidently a desirable condition to cope with the large starting surge experienced by the armatures before a back voltage has been built up.

What is claimed is:
1. A control system for battery powered ground vehicles comprising:
 a direct current motor-generator (20) secured to said vehicle and provided with: a rotary armature having a torque shaft (76), a brush commutated armature winding (22) for said armature and a magnetic field circuit excitable by a field winding (24);
 a drive wheel (29) having an axle secured to said vehicle, and being in contact at its periphery with the ground;
 means (27, 28) for coupling the axle of said wheel with said torque shaft;
 a storage battery (35) mounted in said vehicle;

means (37, 43, 51) to connect said armature winding to said battery;
a servoamplifier (50) having an input and an output;
means (47) to connect the output of said amplifier to said field winding;
sampling means (56) to produce a first bipolar feedback signal having a magnitude proportional to the current through said armature winding and having a polarity dependent on the direction of current through said armature;
vehicle control means (66, 72) to produce a second bipolar signal having a magnitude which is a function of torque demand and having a polarity dependent on the desired direction of power flow through said torque shaft;
a summing network (65) to energize the input to said servoamplifier with an error signal equal to the algebraic sum of said first and second signals; and
a source of electric power (35) for said servoamplifier (50), said source of power (35) being acted on in said amplifier by the error signal of said summing network (65) so as to control the current flowing from the said power source (35) through said field (64) to be a function of said error signal generated by said summing network (65).

2. In a system according to claim 1:
said coupling means (27, 28) including a centrifugal clutch (27) for disconnecting said torque shaft (76) from said wheel (29) below a predetermined motor-generator speed.

3. In a system according to claim 1:
there being at least two said motor-generators (20, 21) each having coupled thereto a drive wheel (29, 32);
said means for connecting said armatures to said battery including switch means (51) for shifting the interconnections to said armatures between series to parallel; and
means (53, 52, 54) responsive to a predetermined velocity of said vehicle for actuating said switch means.

4. In a system according to claim 1:
said vehicle control means (63, 66, 67, 68, 69, 70, 71, 77) including:
 a torque demand pedal (66);
 spring means (77) to bias said torque demand pedal towards a zero displacement position; and
 means responsive to the position of said pedal to produce said second bipolar signal.

5. In a system according to claim 4:
differentiating means (64) to produce a third signal proportional to the rate of change of said pedal displacement; and
said summing network (65) being adapted to apply an error signal to the input of said servoamplifier (50) equal to the algebraic sum of said first, second and third signals.

6. A control system for ground vehicle comprising:
a direct current motor-generator (20) secured to said vehicle and provided with: a rotary armature having a torque shaft (76), a brush commutated armature winding (22) for said armature and a magnetic field circuit excitable by a field winding (24);
a drive wheel (29) having an axle secured to said vehicle, and being in communication with the ground;
means (27, 28) for coupling the axle of said wheel with said torque shaft;
a source of electric armature power associated with said vehicle;
means to connect said associated source of electric energy to the brushes of said armature winding;
a servoamplifier (50) having an input and an output;
means (47) to connect the output of said amplifier to said field winding;
sampling means (56) to produce a first bipolar feedback signal having a magnitude proportional to the current through said armature winding and having a polarity dependent on the direction of current through said armature;
vehicle control means (66, 72) to produce a second bipolar signal having a magnitude which is a function of torque demand and having a polarity dependent on the desired direction of power flow through said torque shaft;
a summing network (65) to energize the input to said servoamplifier with an error signal equal to the algebraic sum of said first and second signals; and
a source of electric power (35) for said servoamplifier (50), said source of power (35) being acted on in said amplifier by the error signal of said summing network (65) so as to control the current flowing from the said power source (35) through said field (64) to be a function of said error signal generated by said summing network (65).

References Cited

UNITED STATES PATENTS

| | | |
|---|---|---|
| 450,742 | 4/1891 | Johnson. |
| 2,658,174 | 11/1953 | Warick 318—111 X |
| 3,163,252 | 12/1964 | Kochi 180—65 |
| 3,166,700 | 1/1965 | Zarleng 318—434 X |
| 3,183,422 | 5/1965 | Stamm 290—40 X |
| 3,190,387 | 6/1965 | Dow 180—65 |
| 3,263,142 | 7/1966 | Adouette et al. |

BENJAMIN HERSH, *Primary Examiner.*

M. L. SMITH, *Assistant Examiner.*

U.S. Cl. X.R.

318—84, 95, 139, 327